United States Patent [19]

Huvey

[11] Patent Number: 4,811,761
[45] Date of Patent: Mar. 14, 1989

[54] FLEXIBLE TUBE FOR CARRYING HEATING OR REFRIGERANT FLUIDS

[75] Inventor: Michel Huvey, Bougival, France

[73] Assignee: Institit Francais du Petrole, Rueil-Malmaison, France

[21] Appl. No.: 904,154

[22] Filed: Sep. 5, 1986

Related U.S. Application Data

[63] Continuation-in-part of Ser. No. 663,367, Oct. 22, 1984.

[51] Int. Cl.⁴ ............................................. F16L 11/04
[52] U.S. Cl. ..................................... 138/122; 138/172
[58] Field of Search ........................ 138/121, 122, 172

[56] References Cited

U.S. PATENT DOCUMENTS

| | | | |
|---|---|---|---|
| 1,179,578 | 4/1916 | Sundh | 138/122 |
| 1,819,175 | 8/1931 | James | 138/122 |
| 4,009,735 | 3/1977 | Pinsky | 138/147 |
| 4,417,603 | 11/1983 | Argy | 138/122 X |

FOREIGN PATENT DOCUMENTS 1333402 9/1962 France ............................. 138/121

Primary Examiner—William A. Cuchlinski, Jr.
Attorney, Agent, or Firm—Antonelli, Terry & Wands

[57] ABSTRACT

A flexible tube including a sheath having a corrugated outer surface wherein a path of intersection of the corrugated outer surface with a plane passing through a center axis of the tube corresponds to a curve having undulations defining a number of hollow portions and rounded zones interconnecting adjacent hollow portions. The rounded zones have at each point an osculating circle having a center situated on a same side of the sheath and a non-infinite radius of curvature. At least one laterally rigid outer reinforcing element fills the hollow portions to a height such that it reaches at least to the rounded zones, and the reinforcing element is non-adhering to walls of the sheath.

25 Claims, 2 Drawing Sheets

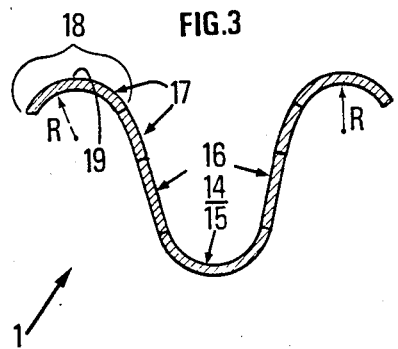
FIG.3
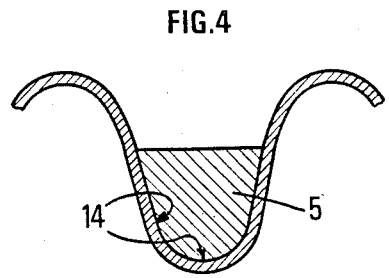
FIG.4
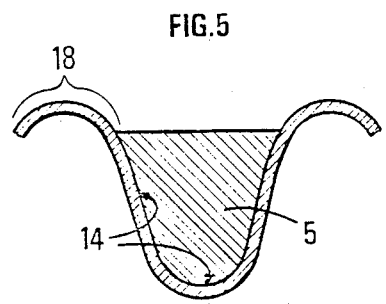
FIG.5
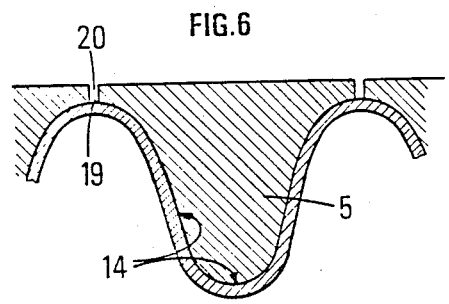
FIG.6

FLEXIBLE TUBE FOR CARRYING HEATING OR REFRIGERANT FLUIDS

BACKGROUND OF THE INVENTION

This application is a continuation-in-part application of Ser. No. 663,367, filed 10/22/84.

The present invention relates to a flexible tube structure having walls which are capable of enduring high pressures without undergoing excessive crushing.

An aim underlying the present invention essentially resides in providing flexible tubes which enable an endurance of differential high pressures regardless of the direction from which the differential high pressures originate.

A further aim of the present invention is to provide tubes for conveying heating fluids, such as water, particularly for urban heating or also for conveying coolant or cooling fluids.

Prior art tubes or tube structures designed for this application are generally designed as a substantially rigid type tube which, as can readily be appreciated, leads to complex and costly constructions for avoiding obstacles and allowing for thermal expansion of the tubes. Moreover, the materials generally used for heat insulation have good compressive strength only if they are of a high density and in such situation, the tubes become ediocre insulators. If the materials used have a low density, the resistance of the tubes to compression is relatively low and, consequently, when such tubes are subjected to considerable external pressures by, for example, burying the tubes underground, a considerable crushing of the thermal insulation material occurs, with such crushing being accompanied by a deterioration in the material thermal insulation properties. The tube constructed in accordance with the present invention seeks to avoid many of the disadvantages encountered in the prior art constructions.

In this connection, the prior art may be best illustrated by, for example, FR-A No. 1,550,000, FR-A No. 1,333,402 and FR-A No. 2,337,298, GB-A No. 591,307 and GB-A No. 1,414,113, as well as by European Patent Application EP-A No. 0050469.

In the above noted FR-A No. 1,550,000, a corrugated tube is proposed wherein undulations therein are filled with a flexible material or an elastomer adhering to the base material of the corrugated tube.

In accordance with advantageous features of the present invention, specific configuration characteristics of a corrugated sheet and a reinforcing element are proposed which enable the properties of the resulting product, i.e., the flexible tube to be considerably enhanced.

In accordance with the present invention, at least one reinforcing element is used which closely matches the shape of the corrugations and which does not adhere to the basic material of the tube. Moreover, according to the present invention, the at least one reinforcing element is transversely rigid and may have a means for resisting a longitudinal traction such as, for example, a braid.

While French Application FR-A No. 2,337,298 proposes a rigid tube with high insulation wherein a fluid at an intermediate temperature circulates against the current of the main flow in a central position, such arrangement is not comparable to the tube of the present invention and, moreover, the longitudinal separations ensuring a proper circulation of the gases in the first annular space or annular ring cannot be compared to the alveolate or cellular structure of the tube contemplated by the present invention.

While British GB-A No. 591,307 proposes a reinforced flexible hose composed of an impermeable sheath and pieces of fabric pinched between two metal spirals with the same pitch, one inside and the other outside, in accordance with this proposed arrangement, the radius of the torus remains large and, consequently, the strength of the fabric layer must be high in order for the tube to withstand high pressures. Consequently, the tube proposed in this reference has the disadvantages of high cost, low flexibility, and low strength.

British reference GA-A No. 1,414,113 proposes a tube having an insulator between two layers of fabric, with European Application EP-A No. 0050469 proposing a particular form for reinforcing elements; however, neither of these proposals provide any indication as to specific configuration characteristics of the corrugated sheath and reinforcing element which enhances the overall properties of the corrugated tube.

In accordance with the present invention, a flexible tube is provided which includes a sheath having an outer surface of a corrugated shape, that is, a path of intersection of the outer surface of the sheath with a plane passing through the axis of the flexible tube corresponding to a curve with undulations. The undulations are composed of a succession of hollows and rounded zones, with the hollows being in a portion of the sheath near the tube axis and the rounded zones being located in a portion of the sheath remote from an axis of the tube. The rounded zones have, at each point, an osculating circle a center of which is located on a same side of the sheath with a radius of curvature which is not infinite, and the curvature of the round zone is oriented toward an axis of the tube.

Advantageously, in accordance with the present invention, the tube has at least one reinforcing element which is laterally rigid and which fills the hollows to a height such that the reinforcing element reaches at least to the rounded zones and, a reinforcing element is provided which does not adhere to the walls of the sheath.

When each of the rounded zones has, at its peak, a portion with a substantially constant radius of curvature, the reinforcing element has a sufficient height for filling the hollows and the space between two successive rounded zones until it reaches at least the portions of the rounded zone with a constant radius of curvature.

By virtue of the features of the present invention, the reinforcing element can fill the hollows and extend substantially over the entire height of the undulation and touch the peak of the undulation while providing a discontinuity of the reinforcing element at the periphery of the sheath between two successive undulations.

Consequently, by virtue of the present invention, the reinforcing element fills the hollows, the spaces between two successive rounded zones, and extends beyond the peaks of the rounded zones while having a discontinuity at the periphery of the sheath between two successive undulations. Advantageously, in accordance with the present invention, the reinforcing element may include, for example, resin and/or fibers.

The sheath according to the present invention may have one or more internal reinforcing elements, with an intersection of the sheath, with a longitudinal plane penetrating inside the sheath defining undulations with a predetermined height or amplitude, which height or amplitude is measured taking into consideration the undulation on the external surface of the sheath.

The tube of the present invention has at least one outer reinforcing element having an internal surface which matches the shape of a hollow of an undulation which it fills for a predetermined height without thereby adhering to the sheath, and has a resistance or reinforcing means for resisting longitudinal traction which, for example, may be an external reinforcing braid, which resistance or reinforcing means surrounds the internal sheath provided with the outer reinforcing element, and allows an elongation of the inner sheath to be limited when the inside sheath is pressurized.

Advantageously, the outer reinforcing element is transversely rigid and an outer surface of the outer reinforcing element may, for example, have a shape which is substantially and at least partially inscribed in a cylinder.

The flexible tube of the present invention has an alveolate or cellular structure covering either the outer reinforcing element or the reinforcing braid, with the alveolate or cellular structure being flexible in a longitudinal direction of the tube and rigid in the radial direction. Advantageously, the alveolate or cellular structure is filled with a material having high thermal or heat insulation properties and, the flexible tube of the present invention may be covered with an outer protection sheath.

In accordance with the further advantageous features of the present invention, a negative pressure may be created in a space defined between the inner sheath and the outer sheath, with the negative pressure creating a partial vacuum in such space with such partial vacuum forming a good heat insulator.

The depressurization or creation of a vacuum of the space defined by the inner and outer sheaths does not cause a crushing of the outer sheath since the outer sheath rests on the alveolate or cellular structure.

The above and other objects, features, and advantages of the present invention will become more apparent from the following description when taken in connection with the accompanying drawings which show, for the purpose of illustration only, several embodiments in accordance with the present invention.

BRIEF DESCRIPTION OF THE DRAWINGS

FIG. 3 is a cross-sectional view of a portion of an undulation of the flexible tube constructed in accordance with the present invention; and FIGS. 4–6 are cross-sectional views of a portion of an undulation of a tube constructed in accordance with the present invention respectively depicting alternative manners of filling the hollow or undulation with a reinforcing element.

DETAILED DESCRIPTION

Figure 1:
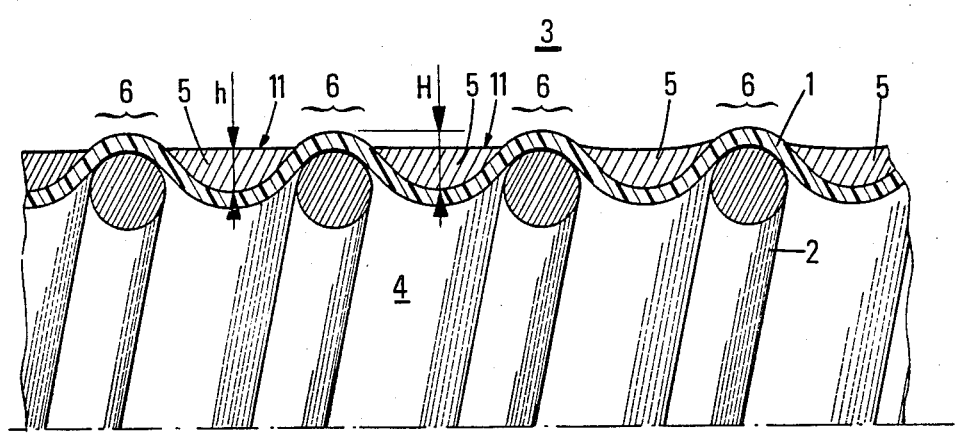
FIG. 1 is cross-sectional view of a flexible tube constructed in accordance with the present invention.

Referring now to the drawings wherein like reference numerals are used throughout the various views to designate like parts and, more particularly, to FIG. 1, according to this figure, a flexible tube is provided which includes an inner undulated or corrugated sheath 1, with the inner undulated sheath 1 including internal reinforcing means 2 which may, for example, take the form of a plurality of rings or a helical element. The internal reinforcing means 2 allow the inner sheath 1 to withstand radial compressive stresses resulting from a pressure prevailing at an outside 3 of the tube, which pressure is greater than a pressure prevailing at an interior 4 of the flexible tube. An intersection of the flexible tube with a longitudinal plane penetrating inside of the sheath 1 defines the undulations.

According to the present invention, the inner undulated or corrugated sheath 1 is reinforced by placing an outer reinforcing element 5 on the undulated sheath, with the outer reinforcing element 5 being accommodated in the hollows of the undulations or corrugations of the sheath 1 and matching the shape of the undulations or corrugation filled thereby to a depth h. As shown in FIGS. 1, 2, 4 and 5, the depth or height h is less than the depth or height H of the corrugation or undulation and, consequently, the zones or areas 6 of the inner sheath 1 are not in contact with the reinforcing element 5. The zones or areas 6 are not areas which permit flexibility of the flexible tube but the movement of the reinforcing element 5 relative to the inner sheath 1 permits a local elongation of the flexible tube. The outer reinforcing element 5 may, for example, include fibrous materials such as, for example, fiberglass.

Additionally, the outer reinforcing element 5 may include several rings or one or more helices depending on the course or path on the structure of the inner sheath 1. The outer reinforcing element 5 includes an outer face which, at least partially, is substantially inscribed in a cylinder. The internal reinforcing means 2 may be eliminated in, for example, a situation wherein the internal pressure 4 is always greater than the external pressure 3.

FIGS. 3 to 6 illustrate the respective configurations of the sheath and of the reinforcing element according to the present invention.

In the arrangement of FIG. 3, the corrugation or undulation corresponds to the path of intersection of the inner sheath 1 with a plane passing through the axis 13 of the inner sheath 1 or the longitudinal plane. In FIG. 3, the flexible tube is assumed to be rectilinear while at rest and, if such is not the case, the term corrugation or undulation corresponds to the path of the inner sheath 1 obtained on a developed surface of a cylindrical surface generated by a line resting on an axis of the sheath, with the cylindrical surface intersecting the sheath.

In the construction of FIG. 3, the corrugation or undulation has a hollow zone 14 which includes a curved part 15 and a substantially straight part 16. The undulation also includes a rounded zone or portion 17 at least when the inner sheath 1 is subjected to an internal pressure, with osculating circles of this rounded zone 17 having a non-infinite radius with a center thereof being included on a same side of the inner sheath 1 and of the side of the axis of the sheath. Consequently, the curvature of the rounded zone 17 is directed toward the axis 13 of the inner sheath 1. Generally, the rounded zone or portion 17 has a portion 18 with a constant radius located on either side of the peak 19 of the undulation.

In the construction of FIG. 4, the reinforcing element 5 fills the hollow zone 14 of the undulation and extends at least up to a beginning area of the rounded zone 17.

In the arrangement of FIG. 5, the reinforcing element 5 extends, beginning from the hollow zone 14 up to at least a beginning of the portion 18 of constant radius of the rounded zone 17.

In FIG. 6, the reinforcing element 5 extends, beginning from the hollow zone 14 of the corrugation or undulation, beyond the peak 19 of the undulation and, as can be appreciated, the reinforcing element 5 may also contact or touch the peak 19 of the undulation.

In all of the above described embodiments, the reinforcing elements 5 of two successive undulations have a discontinuity or gap 20, which discontinuity permits the flexibility of the flexible tube.

By virtue of the features of the present invention, the reinforcing element 5 perfectly matches the shape of the corrugation or undulation but does not adhere thereto. Moreover, the reinforcing element 5 is rigid laterally and axially so that it can support the circumferential stresses which appear when the inner sheath 1 is presurized. Additionally, if the portion 18 with the constant radius corresponds to a sector greater than 180°, such an arrangement would not represent a departure from the scope of the present invention.

By virtue of the flexible tube of the present invention, it is possible to retard the threshold of compressive deformation of the inner sheath 1 as compared with flexible tubes of the prior art. Moreover, the fact that the reinforcing means is laterally rigid causes the neutral fiber of the flexible tube to be on the side of the flexible tube in compression and no longer on the axis of the flexible tube when flexed.

It is also significant in accordance with the present invention that, while at rest, the reinforcing element 5 of the flexible tube matches the shape of the inner sheath 1 to the greatest possible extent and, such is accomplished, by virtue of the provision of a reinforcing element 5 which includes a resin, which resin can be placed in the corrugations or undulations prior to hardening and subsequently cured.

As apparent, at the end of this operation, if necessary, the flexible tube can be deformed to release the reinforcing element 5 of the inner sheath.

Likewise, if the reinforcing element 5 is mounted so as to touch or contact a peak 19 of the undulation or corrugation, the flexible tube can be deformed in such a manner so as to definitely break the film which links or may link the top across the peak 19 of the undulation or corrugation with the reinforcing element 5 so as to ensure the existence of two successive portions on the respective sides of the discontinuity of the reinforcing element 5.

As noted hereinabove, the reinforcing means or element 5 according to the present invention may include fibrous elements. In order to reinforce the flexible tube described hereinabove in a longitudinal direction, the flexible tube may be provided with longitudinal tractive resistance means such as, for example, a braid 7 schematically illustrated in FIG. 2 and, the flexible tube may be formed in this manner to include a protective outer sheath 8.

Figure 2:
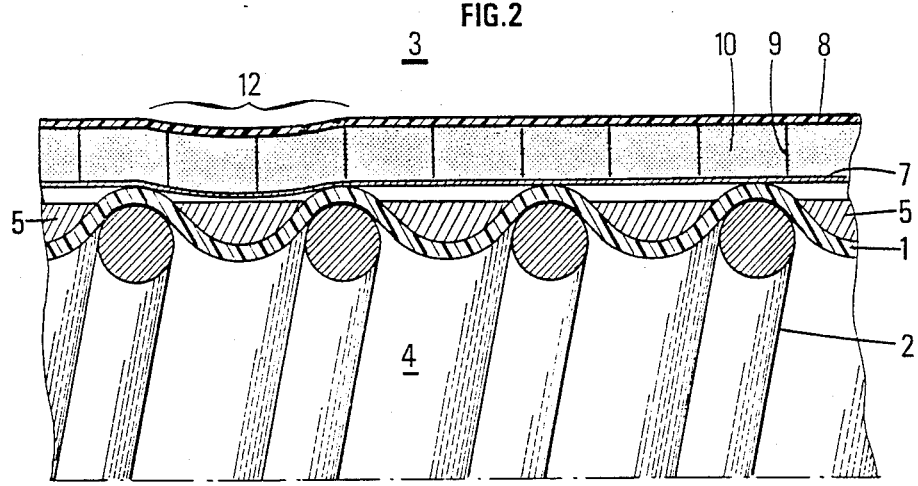
FIG. 2 is a cross-sectional view of a flexible tube according to the present invention having an alveolate or cellular structure.

In accordance with a particularly advantageous embodiment of the present invention, to reduce a heat exchange between the external environment and the pressure medium 4 inside the flexible tube, a cellular or alveolate structure 9 is placed externally around the inner sheath 1 provided with the outer reinforcing means or element 5 and possibly with a reinforcing braid 7. The alveolate or cellular structure 9 is rigid in (one) a radial direction due to partitions having a direction essentially perpendicular to a longitudinal axis of the flexible tube. It can be covered with a protective outer sheath 8. Advantageously, the cells of the alveolate or cellular structure 9 may be filled with a material 10 having a high heat-insulating property. When the alveolate or cellular structure 9 of the flexible tube is filled with insulating material 10, it is the alveolate or cellular structure 9 which transmits the crushing stresses 12 and not the insulating material 10 (FIG. 2). Thus, it is possible for the flexible tube of the present invention to withstand high compressive stresses on the walls without crushing the insulating material 10 even if the insulating material 10 has a very low compressive strength. As noted above, the crushing of the heat-insulating material 10 is generally accompanied by a deterioration of the heat insulating properties of the heating insulating materials 10.

When the flexible tube of the present invention has a protective water tight outer sheath 8, it is possible to create, by a pumping means, a partial vacuum in the annular space between the outer sheath and the inner sheath which is separated by the alveolate or cellular structure 9 thereby resulting in providing the definite advantages of good heat insulation and low cost.

Additionally, the above described embodiment allows leaks to be detected prior to reaching major proportions, which leaks are always extremely expensive. In the event of a leak, even a minor leak, the pumping means reacts by pumping at a higher speed than normal and, in such cases, an alarm means (not shown) could alert operators of the existence of a problem.

A flexible tube such as proposed by the present invention may be readily used for carrying heat-transfer fluids such as, for example, in urban heating situations, and for carrying coolant or cooling fluids or, in general, for carrying fluids where it is desired to limit heat exchanges during a transportation phase, for example, in transporting heavy oil or liquified natural gas.

While I have shown and described several embodiments in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A flexible tube comprising an inner sheath having a corrugated outer surface wherein a path of intersection of the corrugated outer surface with a plane passing through the center axis of the flexible tube corresponds to a curve having undulations defining a succession of hollow portions and rounded zones interconnecting the adjacent hollow portions, the hollow portions being located in a portion of the inner sheath near the center axis of the tube, said rounded zones being located in a portion of the sheath remote from the center axis of the flexible tube, said rounded zones having at each point an osculating circle having a center disposed on a same side of said inner sheath and a non-infinite radius of curvature, and a curvature of the rounded zones is oriented toward the center axis of the flexible tube, at least one laterally rigid outer reinforcing means is disposed in said hollow portions, said at least one reinforcing means having a height such that a portion thereof contacts the hollow portions at least to the rounded zones, and wherein said at least one reinforcing means is constructed so as to perfectly match a shape of the undulations and is non-adhering to said inner sheath.

2. A flexible tube according to claim 1, wherein each of said rounded zones includes a peak portion and a portion having a substantially constant radius of curvature, and wherein said reinforcing means has a height sufficient to fill said hollow portions and spaces between two successive rounded zones and extending at least to the portions having the substantially constant radius of curvature.

3. A flexible tube according to claim 2, wherein said reinforcing means fills said hollow portions and extends substantially over an entire height of the respective undulations including the peak portion, and wherein a gap is provided in said reinforcing means at the outer periphery of said inner sheath between successive undulations.

4. A flexible tube according to claim 3, further comprising means for resisting a longitudinal traction of the flexible tube including an outer braid means, said outer braid means surrounding the outer reinforcing means and being adapted to limit an elongation of the inner sheath when a space inside said inner sheath is pressurized.

5. A flexible tube according to claim 4, further comprising an alveolate structure for covering the outer braid means.

6. A flexible tube according to claim 2, wherein said reinforcing means fills said hollow portions and spaces between two successive rounded zones and extends beyond the peak portion of the rounded zone, and wherein a gap is provided in said reinforcing means at a periphery of said inner sheath.

7. A flexible tube according to one of claims 1–4, wherein said outer reinforcing means includes a resin.

8. A flexible tube according to one of claims 1–6, wherein said outer reinforcing means includes fibers.

9. A flexible tube according to claim 8, further comprising an outer braid means for resisting a longitudinal traction of the flexible tube, and an alveolate structure covering said outer braid means, said alveolate structure having partition means disposed substantially perpendicular to the center axis of the flexible tube for rigidifying said alveolate structure.

10. A flexible tube according to claim 9, wherein said alveolate structure is filled with a material having heat-insulating properties.

11. A flexible tube according to claim 10, wherein an outer sheath means is provided for covering said alveolate structure.

12. A flexible tube according to claim 9, wherein an outer sheath means is provided for covering said alveolate structure.

13. A flexible tube according to claim 6, further comprising means for resisting a longitudinal traction of the flexible tube including an outer braid means, said outer braid means surrounding the outer reinforcing means and being adapted to limit an elongation of the inner sheath when a space inside said inner sheath is pressurized.

14. A flexible tube according to claim 13, further comprising an alveolate structure for covering the outer braid means.

15. A flexible tube according to claim 14, wherein said alveolate structure is filled with a material having heat insulating properties.

16. A flexible tube according to claim 15, wherein an outer sheath means is provided for covering said alveolate structure.

17. A flexible tube according to claim 14, wherein an outer sheath means is provided for covering said alveolate structure.

18. A flexible tube according to claim 14, wherein an outer sheath means is provided for covering said alveolate structure, and wherein a space is provided between the alveolate structure and the inner sheath, said space being depressurized.

19. A flexible tube according to claim 1, further comprising means for resisting a longitudinal traction of the flexible tube including an outer braid means, said outer braid means surrounding the outer reinforcing means and being adapted to limit an elongation of the inner sheath when a space inside said inner sheath is pressurized.

20. A flexible tube according to claim 19, comprising an alveolate structure for covering the outer braid means.

21. A flexible tube according to claim 20, wherein said alveolate structure includes partition means disposed substantially perpendicular to the center axis of the flexible tube for rigidifying said alveolate structure.

22. A flexible tube according to claim 21, wherein said alveolate structure is filled with a material having high heat-insulating properties.

23. A flexible tube according to claim 22, wherein an outer sheath means is provided for covering said alveolate structure.

24. A flexible tube according to claim 2, further comprising means for resisting a longitudinal traction of the flexible tube including an outer braid means, said outer braid means surrounding the outer reinforcing means and being adapted to limit an elongation of the inner sheath when a space inside said inner sheath is pressurized.

25. A flexible tube according to claim 24, further comprising an alveolate structure for covering the outer braid means.

* * * * *